United States Patent
Matsuno et al.

(10) Patent No.: US 8,372,541 B2
(45) Date of Patent: Feb. 12, 2013

(54) NON-AQUEOUS ELECTROLYTE SECONDARY BATTERY

(75) Inventors: Shinsuke Matsuno, Kashiwa (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 747 days.

(21) Appl. No.: 12/428,803

(22) Filed: Apr. 23, 2009

(65) Prior Publication Data

US 2010/0075230 A1  Mar. 25, 2010

(30) Foreign Application Priority Data

Sep. 25, 2008  (JP) ................. 2008-246446

(51) Int. Cl.
*H01M 4/58* (2010.01)
*H01M 4/02* (2006.01)
*H01M 4/13* (2010.01)

(52) U.S. Cl. ............. 429/231.95; 429/209; 429/218.1

(58) Field of Classification Search .................. None
See application file for complete search history.

(56) References Cited

U.S. PATENT DOCUMENTS

| | | | |
|---|---|---|---|
| 5,910,382 A | 6/1999 | Goodenough et al. | |
| 6,541,159 B1 * | 4/2003 | Li et al. | 429/236 |
| 2004/0091785 A1 * | 5/2004 | Leonov et al. | 429/306 |
| 2006/0115732 A1 * | 6/2006 | Zaghib et al. | 429/231.1 |
| 2007/0059602 A1 | 3/2007 | Morishima et al. | |
| 2007/0072080 A1 * | 3/2007 | Inagaki et al. | 429/231.1 |

OTHER PUBLICATIONS

Maxim Koltypin, et al., "On the Stability of LiFePO$_4$ Olivine Cathodes under Various Conditions (Electrolyte Solutions, Temperatures)", Electrochemical and Solid-State Letters, vol. 10, No. 2, 2007, pp. A40-A44.

* cited by examiner

*Primary Examiner* — Barbara Gilliam
*Assistant Examiner* — Adam A Arciero
(74) *Attorney, Agent, or Firm* — Oblon, Spivak, McClelland, Maier & Neustadt, L.L.P.

(57) ABSTRACT

A non-aqueous electrolyte secondary battery includes a positive electrode containing lithium-iron phosphate, and a negative electrode containing a lithium-titanium composite oxide and a lithium composite oxide which is different from the lithium-titanium composite oxide. The lithium composite oxide has a potential of 2.5 to 3V vs. Li/Li$^+$ at a lithium absorption/desorption and a spinel-type crystal structure.

14 Claims, 4 Drawing Sheets

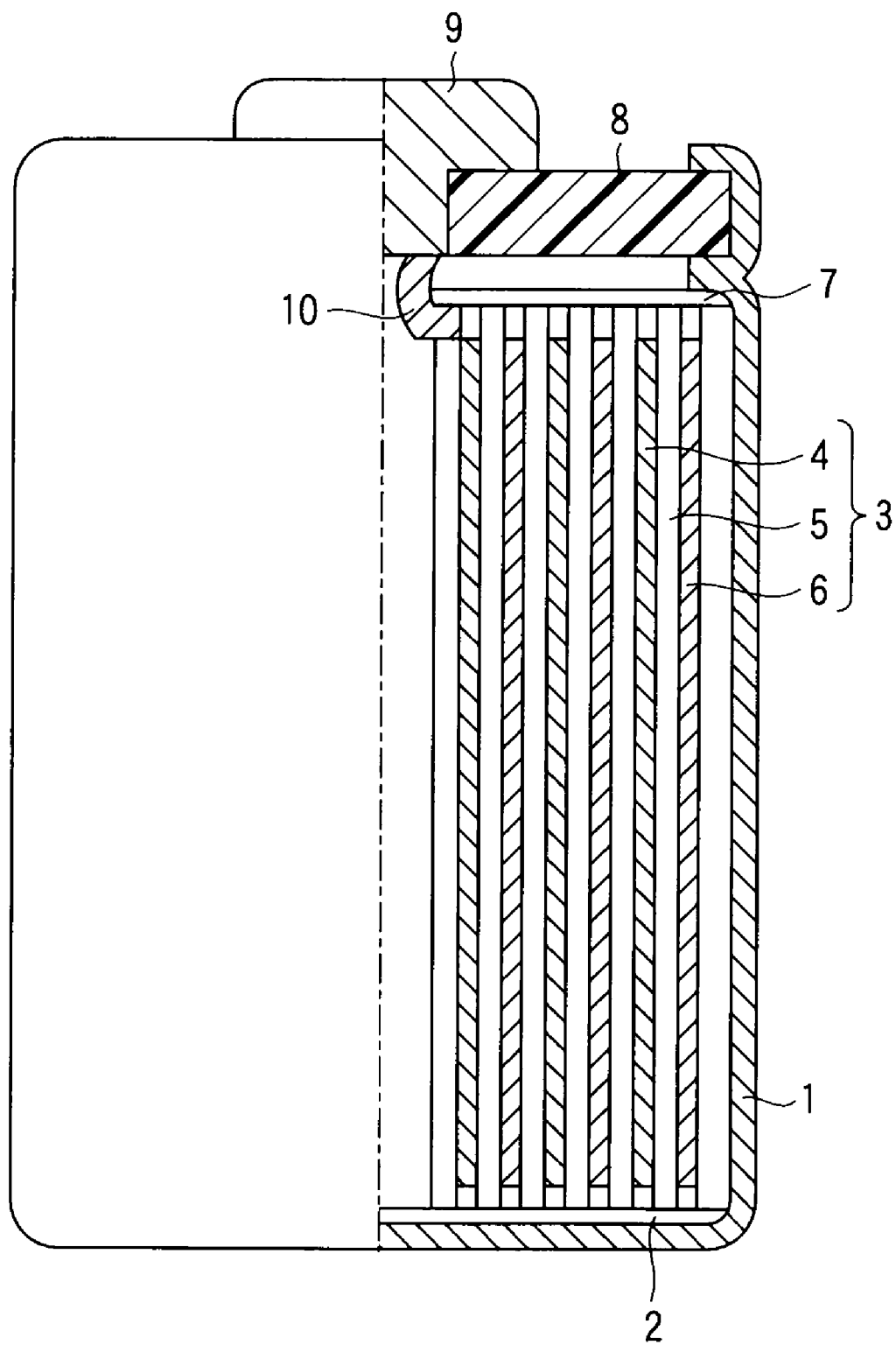
F I G. 1

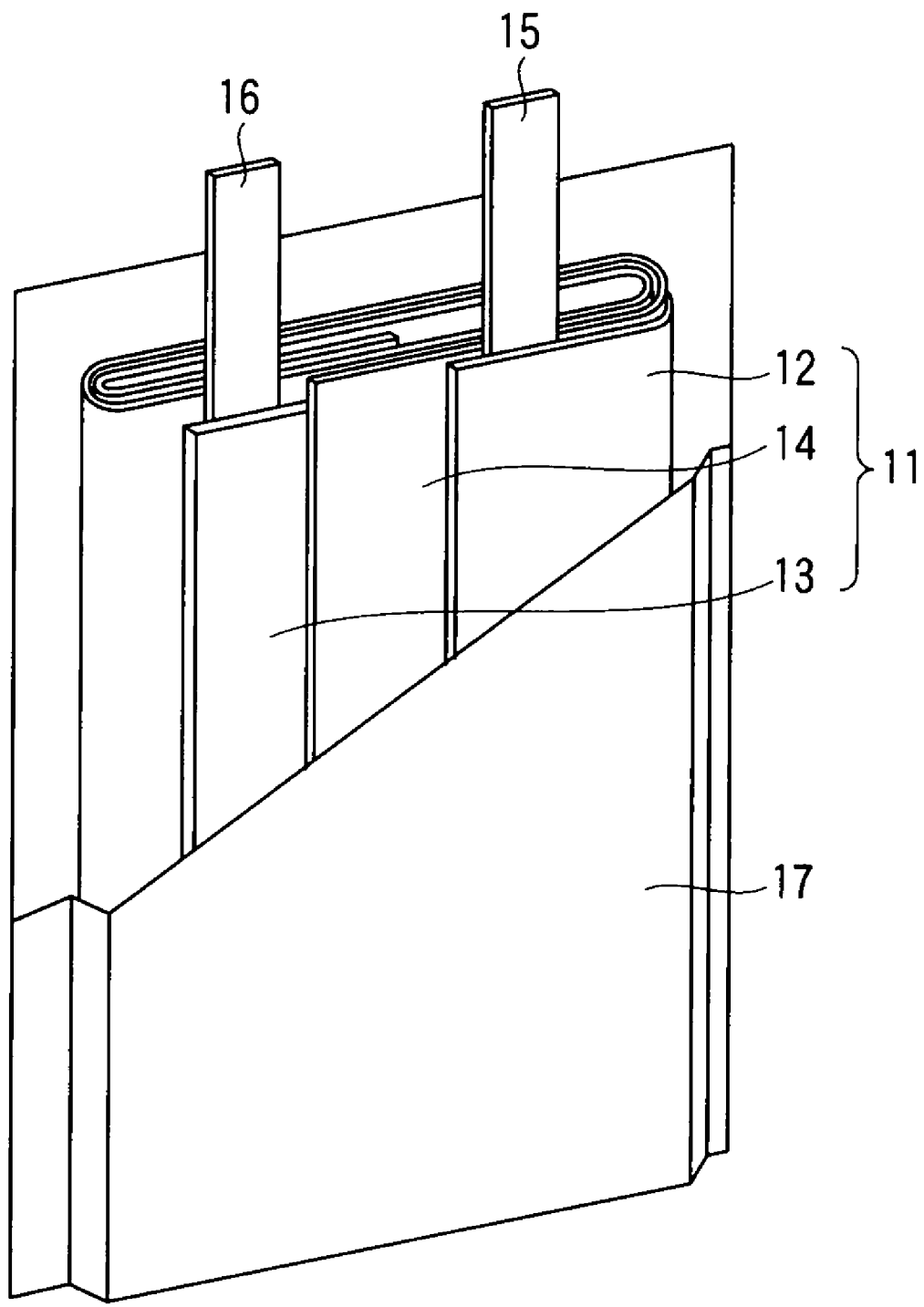
F I G. 2

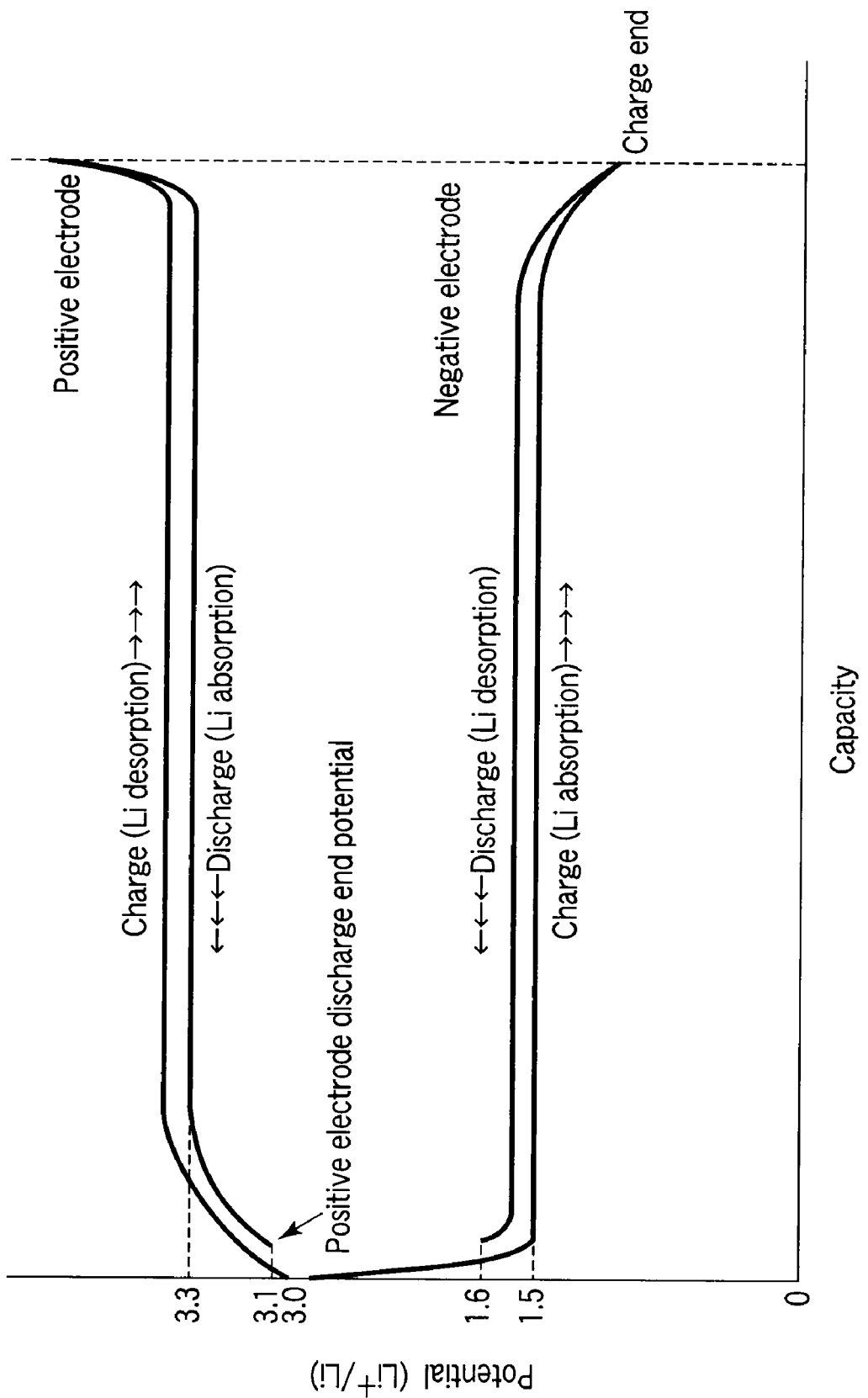
F I G. 3

NON-AQUEOUS ELECTROLYTE SECONDARY BATTERY

CROSS-REFERENCE TO RELATED APPLICATIONS

This application is based upon and claims the benefit of priority from prior Japanese Patent Application No. 2008-246446, filed Sep. 25, 2008, the entire contents of which are incorporated herein by reference.

BACKGROUND OF THE INVENTION

1. Field of the Invention

The present invention relates to a non-aqueous electrolyte secondary battery.

2. Description of the Related Art

Non-aqueous electrolyte secondary batteries which charge and discharge by transfer of lithium ions from the negative electrode to the positive electrode and vice versa are studied and developed enthusiastically. Such a non-aqueous electrolyte secondary battery is expected as large power sources for electric cars and hybrid cars using a combination of an engine and electric motor from the viewpoint of environmental problems. Also, these non-aqueous electrolyte secondary batteries have attracted considerable attention as power sources for devices other than automobiles.

For these non-aqueous secondary batteries used as large power sources, such characteristics that large current can be accumulated momentarily are regarded as more important than the characteristics required for power sources used for small mobile telephones and note-type personal computers.

A lithium ion secondary battery is known as one of these non-aqueous electrolyte secondary batteries. Almost all lithium ion batteries which are commercially available at present use graphite-type materials as the negative electrode material. These graphite-type materials enable high-capacity and long life batteries to be attained. However, when large current is momentarily input to or output from these secondary batteries, metal lithium is easily precipitated on the surface of graphite, giving rise to safety problems.

In order to solve the above problem, a non-aqueous electrolyte secondary battery using a lithium-titanium composite oxide having a higher Li absorption potential than graphite as the negative electrode active material has been put into practical use. The lithium-titanium composite oxide is known to have longer life than graphite-type materials because it is decreased in volume change along with charge-discharge reactions. Among these materials, a lithium-titanium oxide having a spinel structure is very promising.

On the other hand, M. Koltypin et al, "On the Stability Of LiFePO$_4$ Olivine Cathodes under Various Conditions (Electrolyte Solutions, Temperature)" Electrochemical and Solid-state Letters, 10 (2) A40-A44 (2007) discloses a non-aqueous electrolyte secondary battery improved in high-temperature characteristics, rapid charging characteristics and output characteristics by using a lithium-titanium composite oxide as the negative electrode material and a lithium-cobalt oxide (LiCoO$_2$) as the positive active material. The lithium-cobalt oxide is a layered compound and has stable cycle characteristics. However, because this positive electrode active material contains cobalt which is a rare metal, it is an obstacle to economical production. Therefore, an attention is focused on a positive electrode active material excluding cobalt, for example, lithium-iron phosphate (LiFePO$_4$).

A non-aqueous electrolyte secondary battery using the positive electrode active material excluding cobalt and a lithium-titanium composite oxide as the negative electrode active material has high harmony with the environmental and is also superior in large-current characteristics. Therefore, an attention is focused on this non-aqueous electrolyte secondary battery as a large power source including power sources for electric cars and hybrid cars.

However, much residual water exists in the lithium-titanium composite oxide. For this reason, when, particularly, lithium-iron phosphate is used as a positive electrode active material, this residual water dissolves the iron compound of the lithium-iron phosphate, resulting in remarkably deteriorated cycle characteristics.

BRIEF SUMMARY OF THE INVENTION

According to the present invention, there is provided a non-aqueous electrolyte secondary battery comprising: a positive electrode containing lithium-iron phosphate; and a negative electrode containing a lithium-titanium composite oxide and lithium composite oxide which is different from the lithium-titanium composite oxide, lithium composite oxide having a potential of 2.5 to 3V vs. Li/Li$^+$ at a lithium absorption/desorption and a spinel-type crystal structure.

BRIEF DESCRIPTION OF THE SEVERAL VIEWS OF THE DRAWING

FIG. 1 is a partial sectional view showing a non-aqueous electrolyte secondary battery (cylindrical non-aqueous electrolyte secondary battery) according to an embodiment;

FIG. 2 is a partially broken perspective view showing a non-aqueous electrolyte secondary battery (thin-type non-aqueous electrolyte secondary battery) according to an embodiment;

FIG. 3 is a view showing the initial charge-discharge curve of the positive electrode and negative electrode in a conventional non-aqueous electrolyte secondary battery provided with the positive electrode containing a lithium-iron phosphate and the negative electrode containing lithium-titanium composite oxide.

DETAILED DESCRIPTION OF THE INVENTION

Figure 4:
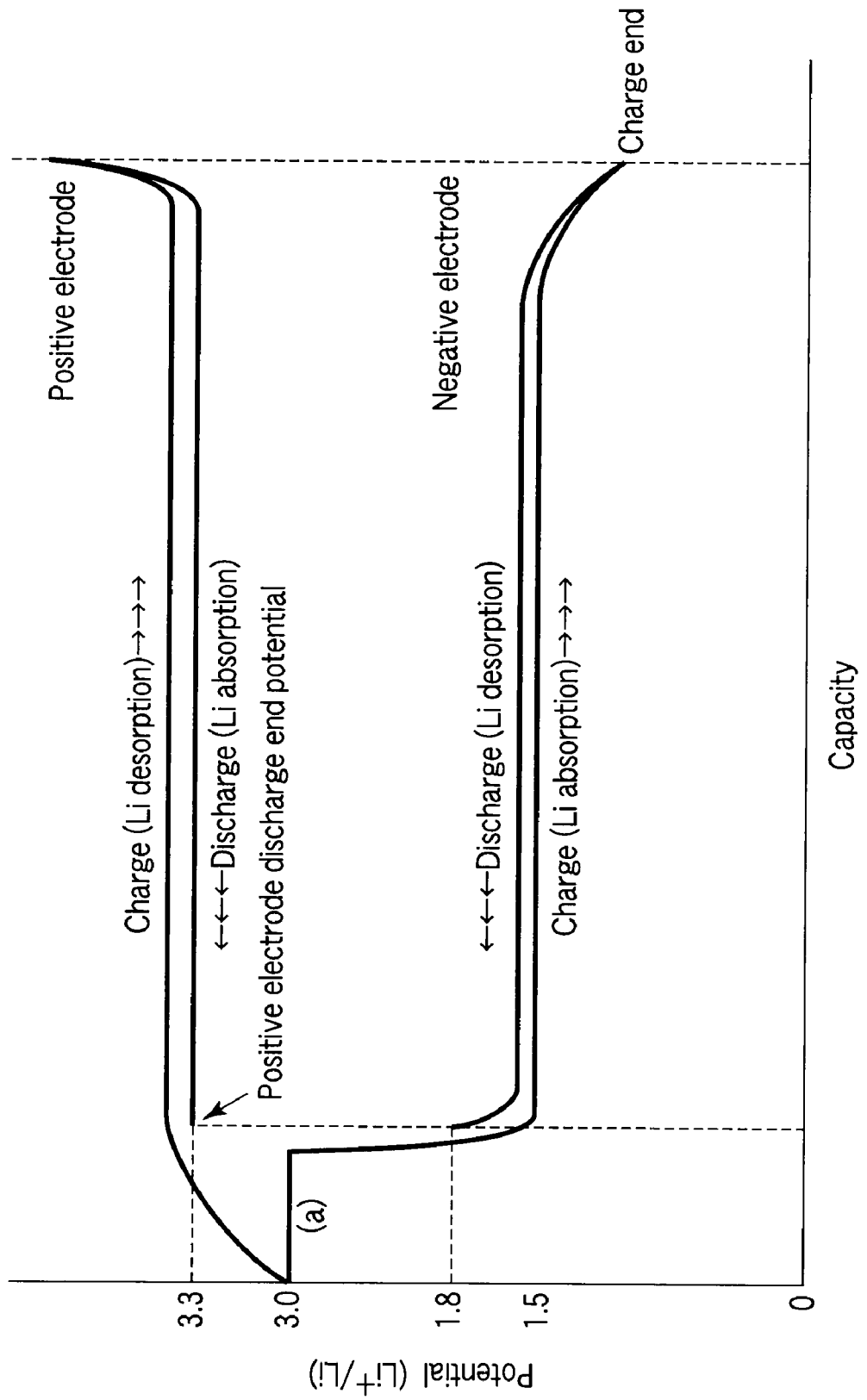
FIG. 4 is a view showing the initial charge/discharge curve of the positive electrode and negative electrode in a non-aqueous electrolyte secondary battery provided with the positive electrode containing lithium-iron phosphate and the negative electrode containing a lithium-titanium composite oxide and lithium-manganese oxide having a spinel-type crystal structure according to the present invention.

A non-aqueous electrolyte secondary battery according to an embodiment will be explained in detail.

The non-aqueous electrolyte secondary battery according to this embodiment comprises a positive electrode containing lithium-iron phosphate (LiFePO$_4$) and a negative electrode containing a lithium-titanium composite oxide and a lithium composite oxide which is different from the lithium-titanium composite oxide and has a potential of 2.5 to 3V (lithium potential basis: vs. Li/Li$^+$) at a lithium absorption/desorption and a spinel-type crystal structure. This "lithium potential basis" means that the potential at which metal lithium is equilibrated with lithium ions in the electrolyte is the standard.

It is known that lithium-iron phosphate which is a positive electrode active material reacts with water in charge/discharge operations to elute an iron compound from a part thereof.

The inventors of the present invention have made various studies concerning the elution mechanism of lithium-iron phosphate. As a result, the inventors have clarified the fact that lithium-iron phosphate particularly reacts with water to make it easy to elute an iron compound in a perfectly discharged state, and, specifically, at a lithium base potential of about 3.1V. The eluted iron compound is temporally dissolved in the non-aqueous electrolyte solution and then deposited thickly as an insulation material layer on the boundary between the lithium-titanium composite oxide which is the negative electrode active material and the non-aqueous electrolyte solution by repeated charge/discharge operations. The inventors have confirmed that the insulation material layer inhibits the diffusion reaction of lithium ions of the negative electrode active material. Therefore, such a phenomenon is observed that the overvoltage of the negative electrode is large, leading to rapid deterioration in cycle characteristics.

From these facts, the inventors have found that a phenomenon that lithium-iron phosphate is put into a perfectly discharged state can be avoided and also, the an another phenomenon that lithium-iron phosphate reacts with water to elute an iron compound can be inhibited or prevented by using, a negative electrode containing a lithium composite oxide having a potential of 2.5 to 3V vs. Li/Li$^+$ at a lithium absorption/desorption and a spinel-type crystal structure together with a lithium-titanium composite oxide. It should be noted that the lithium composite oxide is different from the lithium-titanium composite oxide.

That is, a conventional non-aqueous secondary battery provided with a positive electrode containing lithium-iron phosphate (LiFePO$_4$) and a negative electrode containing lithium-titanium composite oxide (Li$_4$Ti$_5$O$_{12}$) has the characteristics given by the initial charge/discharge curve of the positive electrode and negative electrode as shown in FIG. 3. In the initial charge reaction, lithium transfers from the positive electrode to the negative electrode in the non-aqueous electrolyte solution to absorb lithium into the negative electrode. The potential in the negative electrode reaction is about 1.5V on a lithium potential basis. When lithium is absorbed into the negative electrode to allow the progress of charging, the difference in potential between the positive electrode and the negative electrode becomes 2.8V, so that the charge reaction is finished.

On the other hand, the discharge reaction follows a root inverse to that of the charge reaction. When the potential of finishing discharge for a battery is set to 1.5V, the potentials of the negative and positive electrodes become 1.6V and 3.1V on a lithium potential basis, respectively. In other words, the potential of the positive electrode is low in the conventional non-aqueous electrolyte secondary battery, and therefore, lithium-iron phosphate reacts with water, causing easy elution of an iron compound. As a result, a deterioration of cycle characteristics is easily caused.

On the other hand, the non-aqueous electrolyte secondary battery according to the embodiment comprises the positive electrode containing lithium-iron phosphate (LiFeO$_4$) and the negative electrode containing a lithium composite oxide (for example, a lithium-manganese oxide) having a potential of 2.5 to 3V vs. Li/Li$^+$ at a lithium absorption/desorption and a spinel-type crystal structure in combination with lithium-titanium composite oxide (Li$_4$Ti$_5$O$_{12}$). Such a non-aqueous electrolyte secondary battery has the characteristics given by the initial charge/discharge curve of the positive electrode and negative electrode as shown in FIG. 4.

That is, in an initial charge operation, lithium is desorbed from lithium-iron phosphate of the positive electrode to cause the absorption reaction of lithium at the negative electrode. Because the lithium composite oxide (for example, lithium-manganese oxide) has a lithium absorption reaction potential in the vicinity of about 3V on a lithium potential basis, the absorption reaction of lithium into the lithium-manganese oxide takes place. Therefore, after the flat region shown in (a) of FIG. 4 occurs, lithium is absorbed into the lithium-titanium composite oxide.

In the discharge reaction, lithium is desorbed from the lithium-titanium composite oxide and desorbed lithium is absorbed into the positive electrode. In this discharge reaction, it also progresses in the same manner as in the case of the non-aqueous electrolyte secondary battery of the conventional example up to a stage in the middle of a discharge operation. However, since lithium is absorbed into the lithium composite oxide (for example, a lithium-manganese oxide) added in advance to the negative electrode, the number of lithium atoms to be absorbed into the lithium-titanium oxide of the negative electrode to which the lithium-manganese oxide is added is smaller than the number of lithium atoms to be absorbed into the lithium-titanium oxide of the negative electrode to which no lithium-manganese oxide is added. In other words, the lithium-titanium composite oxide discharges all lithium at a stage earlier than that of the conventional non-aqueous electrolyte secondary battery by the reduction in the number of lithium atoms, with the result that the potential of the negative electrode reaches up to 1.8V on a lithium potential basis which potential higher than in the case of the conventional secondary battery, to finish the discharge. At this time, unlike the case of the conventional secondary battery shown in the above FIG. 3, lithium-iron phosphate of the positive electrode finishes discharge imperfectly and the potential of the positive electrode does not reach to the vicinity of 3.1V.

The lithium-manganese oxide added in advance does not participate in the subsequent charge-discharge reaction when the discharge potential of the battery is set to 1.5V. Also, because the lithium-manganese oxide is reduced in volume change in a lithium absorption reaction at 3V, peeling from the negative electrode containing a lithium-titanium composite oxide active material is not caused and this lithium manganese oxide therefore exerts no adverse influence.

Consequently, a phenomenon that the positive electrode active material is put into a perfectly discharged state (potential: near to 3.1V) can be avoided and also, an another phenomenon that lithium-iron phosphate reacts with water to elute an iron compound can be inhibited or prevented by including a lithium composite oxide, for example a lithium-manganese oxide, as the negative electrode active material. As a result, a non-aqueous electrolyte secondary battery is realized with stable cycle characteristics.

Next, structural members of the non-aqueous electrolyte secondary battery including positive and negative electrodes will be described.

1) Positive Electrode

The positive electrode comprises a current collector made of an aluminum foil or an aluminum alloy foil and a positive electrode layer formed on one or both surfaces of the current collector and containing an active material, conductive agent and binder. The positive electrode may be manufactured by suspending the active material, the conductive agent and the binder in a proper solvent to prepare slurry, and applying the slurry to one or both surface of the current collector, followed by drying and pressing.

The active material contains lithium-iron phosphate (LiFePO$_4$). The active material may contain active materials other than lithium-iron phosphate, for example, various oxides and polymers. As the oxide, for example, manganese dioxide ($MnO_2$), lithium-manganese composite oxide (for example, $LiMn_2O_4$ or $LiMnO_2$), lithium-nickel composite oxide (for example, $LiNiO_2$), lithium-cobalt composite oxide ($LiCoO_2$), lithium-nickel-cobalt composite oxide (for example, $LiNi_{1-x}Co_xO_2$), lithium-manganese-cobalt composite oxide (for example, $LiMn_xCo_{1-x}O_2$) or vanadium oxide (for example, $V_2O_5$) may be used. Here, x and y preferably satisfy the following equations: $0<x\leq1$ and $0\leq y\leq1$.

As the above polymer, a conductive polymer material such as a polyaniline, polypyrrole, or disulfide-type polymer material may be used. Active materials other than lithium-iron phosphate such as sulfur (S) or fluorocarbon may be also used.

As the conductive agent, for example, acetylene black, carbon black or graphite may be used.

As the binder, a polytetrafluoroethylene (PTFE), polyvinylidene fluoride (PVdF), fluoro-rubber, ethylene-butadiene rubber (SBR) or carboxymethyl cellulose (CMC) may be used.

With regard to each ratio of the active material, conductive agent and binder to be compounded, it is preferable that the active material is 80 to 95% by weight, the conductive agent is 3 to 20% by weight and the binder is 2 to 7% by weight.

2) Negative Electrode

The negative electrode comprises a current collector, and a negative electrode layer formed on one or both surfaces of the current collector. The negative electrode layer contains a mixture of a lithium-titanium composite oxide and a lithium composite oxide as an active material, conductive agent and binder. The lithium composite oxide is different from the lithium-titanium composite oxide and having a potential of 2.5 to 3V vs. $Li/Li^+$ at a lithium absorption/desorption and a spinel-type crystal structure. The negative electrode is manufactured by suspending the active material, the conductive agent and the binder in a proper solvent to prepare slurry, and applying the slurry to one or both surfaces of the current collector, followed by drying and pressing.

The lithium-titanium composite oxide (for example, $Li_4Ti_5O_{12}$) has a potential of about 1.5V vs. $Li/Li^+$ at a lithium absorption/desorption. Namely, the lithium composite oxide having a spinel-type crystal structure has a higher potential than the lithium-titanium composite oxide.

The lithium composite oxide having the above potential and a spinel-type crystal structure is preferably a lithium-manganese composite oxide or a lithium-manganese oxide in which a part of manganese is substituted with at least one metal selected from Ti, Li, Al, Ni, Cr and Mg.

The lithium composite oxide having a spinel-type structure is preferably a lithium-manganese-containing oxide represented by the general formula $Li_{1+p}(Mn_{1-x}M_x)_2O_4$ (where, M is at least one metal selected from the group consisting of Ti, Li, Al, Ni, Cr and Mg, and x and p satisfy the following equations: $0\leq x\leq0.5$ and $0\leq p\leq1$. When, in the above general formula, x exceeds 0.5, the substitution of each transition metal is difficult and it is therefore difficult to retain a spinel structure.

In the general formula, x preferably satisfies the following equation: $0\leq x\leq0.3$. A lithium-manganese composite oxide represented by the above general formula in which x satisfies the following equation: $0<x\leq0.5$, that is, when a part of manganese is substituted with a metal M can more inhibit a volume change than a lithium-manganese composite oxide in which manganese is not substituted at all (x=0). Al, Ni or Mg among the substitution metals M is preferable because substituted lithium-manganese complex oxide is easily synthesized. p in the above general formula indicates the amount of lithium to be absorbed into the lithium complex oxide at time of charge.

The lithium composite oxide having a spinel-type crystal structure is preferably formulated in an amount of 1 to 20% by weight based on the total amount of the lithium composite oxide and lithium-titanium composite oxide. When the ratio of the lithium composite oxide to be formulated is less than 1% by weight, it is difficult to obtain the effect of the formulation of the lithium composite oxide sufficiently. When the ratio of the lithium composite oxide to be formulated exceeds 20% by weight on the other hand, there is a fear as to deterioration in the capacity of the negative electrode. The ratio of the lithium composite oxide to be formulated is preferably 1 to 15% by weight, more preferably 1 to 10% by weight and even more preferably 5 to 10% by weight.

As the conductive agent, for example, a carbon material may be used. For example, carbon materials such as acetylene black or carbon black may be used.

As the binder, a polytetrafluoroethylene (PTFE), polyvinylidene fluoride (PVdF), fluoro-rubber, ethylene-butadiene rubber (SBR) or carboxymethyl cellulose (CMC) may be used.

With regard to each ratio of the active material, the conductive agent and the binder to be compounded, it is preferable that the active material is 70 to 95% by weight, the conductive agent is 0 to 25% by weight and the binder is 2 to 10% by weight.

3) Nonaqueous Electrolyte

As the non-aqueous electrolyte, a liquid non-aqueous electrolyte (non-aqueous electrolyte solution) prepared by dissolving an electrolyte in a non-aqueous solvent, a high-molecular gel-like electrolyte obtained by formulating the above non-aqueous solvent and electrolyte in a high-molecular material, a high-molecular solid electrolyte prepared by formulating the above electrolyte in a high-molecular material or an inorganic solid electrolyte having lithium ion conductivity may be used.

As the non-aqueous solvent in the liquid non-aqueous electrolyte, non-aqueous solvents known in the fields of lithium secondary batteries may be used. For example, cyclic carbonates such as ethylene carbonate (EC) and propylene carbonate (PC) or a mixed solvent of these cyclic carbonates and non-aqueous solvents (hereinafter referred to as a second solvent) having a lower viscosity than these cyclic carbonates may be used. As the second solvent, chain carbonate such as dimethyl carbonate, methylethyl carbonate and diethyl carbonate, cyclic ethers such as tetrahydrofuran and 2-methyltetrahydrofuran; chain ethers such as dimethoxyethane or diethoxyethane; γ-butyrolactone, acetonitrile, methyl propionate or ethyl propionate may be used.

As the electrolyte, alkali salts are preferable and lithium salts are more preferable. As the lithium salts, lithium hexafluorophosphate ($LiPF_6$), lithium tetrafluoroborate ($LiBF_4$), lithium hexafluoroarsenate ($LiAsF_6$), lithium perchlorate ($LiClO_4$) or lithium trifluorometasulfonate ($LiCF_3SO_3$) may be used. Among these compounds, lithium hexafluorophosphate ($LiPF_6$) or lithium tetrafluoroborate ($LiBF_4$) is preferable. The amount of the electrolyte to be dissolved in the non-aqueous solvent preferably is 0.5 to 2 mol/L.

The gel-like electrolyte is a gel-like material obtained by dissolving the above solvent and electrolyte in a high-molecular material. As the high-molecular material, polymers of monomers such as a polyacrylonitrile, polyacrylate, polyvinylidene fluoride (PVdF) or polyethylene oxide (PECO), or copolymers of these monomers or other monomers may be used.

The solid electrolyte is obtained by dissolving the above electrolyte in a high-molecular material and by solidifying the obtained mixture. As the high-molecular material, polymers of monomers such as a polyacrylonitrile, polyvinylidene fluoride (PVdF) or polyethylene oxide (PEO), or copolymers of these monomers or other monomers may be used. Also, examples of the inorganic solid electrolyte include ceramic materials containing lithium. Specific examples of the inorganic solid electrolyte include $Li_3N$ and $Li_3PO_4$—$Li_2S$—$SiS_2$ glass.

A separator may be disposed between the positive electrode and negative electrode. A gel-like or a solid non-aqueous electrolyte layer may be used either in combination with the separator or in place of the separator.

The separator serves to prevent the contact between the positive electrode and negative electrode and is constituted of an insulation material. Moreover, as the separator, those having a shape enabling the electrolyte to move between the positive electrode and negative electrode may be used. For example, a synthetic resin nonwoven fabric, polyethylene porous film or polypropylene porous film may be used for the separator.

The specific structure of the non-aqueous electrolyte secondary battery according to this embodiment will be explained with reference to the drawing.

FIG. 1 is a partial sectional view showing a cylindrical non-aqueous electrolyte secondary battery. A bottomed cylindrical container 1, which is made of, for example, stainless and serves as a negative electrode terminal, is provided with an insulated layer 2 disposed on the bottom thereof. An electrode group 3 is housed in the container 1. The electrode group 3 is manufactured by spirally coiling a positive electrode 4 and negative electrode 6 with a separator 5 interposed therebetween.

A non-aqueous electrolyte solution is housed in the container 1. An insulation paper 7 having an opening in the center thereof is disposed on the upper part of the electrode group 3 in the container 1. An insulation seal plate 8 is fixed to the upper opening of the container 1 by caulking processing. A positive electrode terminal 9 is fitted in the center of the insulation seal plate 8. One end of a positive electrode lead 10 is connected to the positive electrode 4 and the other is connected to the positive electrode terminal 9. The negative electrode 6 is connected to the container 1 serving as a negative electrode terminal through a negative electrode lead (not shown).

FIG. 2 shows a partially broken perspective view of a thin-type non-aqueous electrolyte secondary battery. A flat-type electrode group 11 has a structure in which a positive electrode 12 and negative electrode 13 with a separator 14 interposed therebetween are made into a flat form. A band-shaped positive electrode terminal 15 is electrically connected to the positive electrode 12. A band-shaped negative electrode terminal 16 is electrically connected to the negative electrode 13. An electrode group 11 is housed in an outer package bag 17 made of a laminate film such that the ends of the negative electrode terminal 15 and positive electrode terminal 16 are extended out of the outer package bag 17. A non-aqueous electrolyte solution is housed in the outer package bag 17. The outer package bag 17 is provided with an opening through which the positive electrode terminal 15 and negative electrode terminal 16 are extended. The opening is closed by heat sealing to seal the electrode group 11 and non-aqueous electrolyte solution.

Examples of the present invention will be explained.

Example 1

Production of a Positive Electrode

First, 91% by weight of a lithium-iron phosphate ($LiFePO_4$) powder as an active material, 2.5% by weight of acetylene black, 3% by weight of graphite and 3.5% by weight of polyvinylidene fluoride (PVdF) were added in N-methylpyrrolidone and these components were mixed to prepare slurry. This slurry was applied to an aluminum foil (current collector) of 15 μm in thickness and dried, followed by pressing to manufacture a positive electrode having a positive electrode layer with density of 2.5 g/cm$^3$.

<Production of a Negative Electrode>

99% by weight of a lithium-titanium composite oxide ($Li_4Ti_5O_{12}$) powder and 1% by weight of a lithium-manganese composite oxide ($Li_{1.1}Mn_{1.9}O_4$) having spinel-type crystal structure were mixed to obtain a mixed active material. In succession, 85% by weight of the mixed active material, 5% by weight of graphite, 3% by weight of acetylene black and 7% by weight of PVdF were added to NMP and these components were mixed to prepare slurry. The slurry was applied to a copper foil (current collector) of 11 μm in thickness and dried, followed by pressing to manufacture a negative electrode having a negative electrode layer with density of 2.1 g/cm$^3$.

<Production of an Electrode Group>

The positive electrode, a separator made of a polyethylene porous film, the negative electrode and the same separator were laminated in this order and then, spirally coiled such that the negative electrode is positioned on the outermost periphery to manufacture an electrode group.

<Preparation of a Non-Aqueous Electrolyte Solution>

Ethylene carbonate (EC) and methylethyl carbonate (MEC) were mixed in a ratio of 1:2 by volume to prepare a mixed solvent. 1.0 mol/L of lithium hexafluorophosphate ($LiPF_6$) was dissolved in the mixed solvent to prepare a non-aqueous electrolyte solution.

The electrode group and the electrolyte solution were housed in a bottomed cylindrical container made of stainless. Then, one end of the negative electrode lead was connected to the negative electrode of the electrode group and the other was connected to the bottomed cylindrical container serving as the negative electrode terminal. In succession, an insulation seal plate in which the positive electrode terminal was fitted in the center thereof was prepared. One end of the positive electrode lead was connected to the positive electrode terminal and the other was connected to the positive electrode of the electrode group. Then, the insulation seal plate was fitted in the upper opening of the container by caulking processing to fabricate a cylindrical non-aqueous electrolyte secondary battery as shown in FIG. 1.

Examples 2 to 14

Cylindrical non-aqueous electrolyte secondary batteries were fabricated in the same manner as in Example 1 except that a mixed active material prepared by mixing a lithium-titanium composite oxide ($Li_4Ti_5O_{12}$) powder and a lithium-manganese composite oxide having a spinel-type crystal structure or a metal substituted lithium-manganese composite oxide powder as shown in the following Table 1 in the ratio shown in Table 1 was used as the active material of the negative electrode.

Comparative Example 1

A cylindrical non-aqueous electrolyte secondary battery was fabricated in the same manner as in Example 1 except that only a lithium-titanium composite oxide ($Li_4Ti_5O_{12}$) powder was used as the active material of the negative electrode.

With regard to each cylindrical non-aqueous electrolyte secondary battery obtained in Examples 1 to 14 and Comparative Example 1, the initial discharge capacity and retention rate of the capacity after charge/discharge cycle was repeated 500 times were measured. The results are shown in the following Table 1.

Each secondary battery was subjected to a test in which it was allowed to charge up to 2.8V under a current of 10 A at a measuring environmental temperature of 30° C. for one hour and to discharge under a current of 1 A to 1.5V. It was measured the initial discharge capacity by the test. Also, this charge/discharge operation was repeated to measure the capacity retention ratio after 500 cycles. In this case, the initial discharge retention rate was shown as a relative value (%) calculated based on the initial discharge capacity of the secondary battery of Comparative Example 1. The capacity retention rate after 500 cycles was calculated from the capacity after one cycle (C1) and the value after 500 cycles (C500) according to the following equation.

Capacity retention rate after 500 cycles (%)=(C500/C1)×100.

capacity and in capacity retention rate after 500 cycles than the secondary battery of Example 13 in which manganese contained in lithium-manganese composite oxide having a spinel-type crystal structure is not substituted, secondary battery of Example 1 in which the ratio of the lithium-manganese composite oxide is less than 5% by weight, and secondary battery of Example 14 in which the ratio of the lithium-manganese composite oxide exceeds 15% by weight.

It is to be noted that in the above examples, the explanations are furnished as to the case where the present invention is applied to a cylindrical non-aqueous electrolyte secondary battery. However, the present invention may be likewise applied to an angular non-aqueous electrolyte secondary battery, thin-type non-aqueous electrolyte secondary battery and the like. Also, the shape of the electrode group housed in the battery container is not limited to a spiral form and the battery group may have a structure in which plural electrode groups obtained by laminating a positive electrode, separator and negative electrode in this order on each other are laminated.

Additional advantages and modifications will readily occur to those skilled in the art. Therefore, the invention in its broader aspects is not limited to the specific details and representative embodiments shown and described herein.

TABLE 1

| | Lithium composite oxide having a spinel-type crystal structure | Ratio by weight of a lithium composite oxide | Initial discharge capacity (based on Comparative Example 1) | Capacity retention rate after 500 cycles (based on that of the first cycle) |
|---|---|---|---|---|
| Example 1 | $Li_{1.1}Mn_{1.9}O_4$ | 1% | 99% | 78% |
| Example 2 | $Li_{1.1}Mn_{1.9}O_4$ | 5% | 93% | 82% |
| Example 3 | $Li_{1.1}Mn_{1.9}O_4$ | 10% | 86% | 91% |
| Example 4 | $Li_{1.1}Mn_{1.9}O_4$ | 15% | 80% | 95% |
| Example 5 | $Li_{1.15}Mn_{1.85}O_4$ | 8% | 89% | 92% |
| Example 6 | $Li_{1.33}Mn_{1.67}O_4$ | 9% | 88% | 93% |
| Example 7 | $Li_{1.5}Mn_{0.5}O_4$ | 7% | 90% | 95% |
| Example 8 | $Li(Mn_{0.8}Ni_{0.09}Li_{0.1})_2O_4$ | 8% | 89% | 92% |
| Example 9 | $Li(Mn_{0.85}Al_{0.045}Li_{0.1})_2O_4$ | 7% | 90% | 93% |
| Example 10 | $Li(Mn_{0.72}Al_{0.09}Cr_{0.09}Li_{0.1})_2O_4$ | 10% | 86% | 91% |
| Example 11 | $Li(Mn_{0.72}Mg_{0.18}Li_{0.1})_2O_4$ | 8% | 89% | 92% |
| Example 12 | $Li(Mn_{0.76}Ni_{0.095}Ti_{0.095}Li_{0.05})_2O_4$ | 7% | 91% | 93% |
| Example 13 | $LiMn_2O_4$ | 10% | 86% | 73% |
| Example 14 | $Li(Mn_{0.95}Li_{0.05})_2O_4$ | 20% | 73% | 92% |
| Comparative Example 1 | — | 0% | 100% | 56% |

It is found from the above Table 1 that each of the non-aqueous electrolyte secondary batteries of Examples 1 to 14 comprising a positive electrode having a positive electrode layer containing lithium-iron phosphate as the active material and a negative electrode having a negative electrode layer containing a lithium-titanium composite oxide and also, a lithium-manganese composite oxide having a spinel-type crystal structure or metal substituted lithium-manganese composite oxide as the active material is somewhat more decreased in initial capacity but more improved in capacity retention rate after 500 cycles than the secondary battery of Comparative Example 1 which comprises the positive electrode and negative electrode containing only a lithium-titanium composite oxide as the active material.

Particularly, it is found that each of the secondary batteries of Examples 2 to 12 comprising a negative electrode active material formulated with a lithium-manganese composite oxide which has a spinel-type crystal structure and in which a part of manganese is substituted with a metal in a ratio of 5% to 15% by weight based on the total amount of the lithium-titanium composite oxide and lithium-manganese composite oxide is more improved with high balance in initial discharge Accordingly, various modifications may be made without departing from the spirit or scope of the general inventive concept as defined by the appended claims and their equivalents.

What is claimed is:

1. A non-aqueous electrolyte secondary battery comprising:
    a positive electrode comprising lithium-iron phosphate; and
    a negative electrode comprising a lithium-titanium composite oxide, wherein the lithium-titanium composite oxide is $Li_4Ti_5O_{12}$, and a lithium composite oxide which is different from the lithium-titanium composite oxide, the lithium composite oxide having a potential of 2.5 to 3V vs. Li/Li$^+$at a lithium absorption/desorption and a spinel-type crystal structure;
    wherein the lithium composite oxide is represented by the general formula $Li_{1+p}(Mn_{1-x}M_x)_2O_4$ where M is at least one metal selected from the group consisting of Ti, Li, Al, Ni, Cr and Mg, and x and p satisfy the following equation $0<x\leq0.5$ and $0\leq p\leq1$.

2. The secondary battery according to claim 1, wherein M is at least one metal selected from the group consisting of Ti, Li, and Cr.

3. The secondary battery according to claim 1, wherein M is at least one metal selected from the group consisting of Al, Ni and Mg.

4. The secondary battery according to claim 1, wherein x satisfies the following equation: $0<x\leqq0.3$.

5. The secondary battery according to claim 1, wherein the lithium composite oxide having a spinel-type crystal structure is formulated in an amount of 1 to 20% by weight based on the total amount of the lithium composite oxide and lithium-titanium composite oxide.

6. The secondary battery according to claim 1, wherein the lithium composite oxide having a spinel-type crystal structure is formulated in an amount of 1 to 15% by weight based on the total amount of the lithium composite oxide and lithium-titanium composite oxide.

7. The secondary battery according to claim 1, wherein the lithium composite oxide having a spinel-type crystal structure is formulated in an amount of 1 to 10% by weight based on the total amount of the lithium composite oxide and lithium-titanium composite oxide.

8. The secondary battery according to claim 1, wherein the lithium composite oxide having a spinel-type crystal structure is formulated in an amount of 5 to 10% by weight based on the total amount of the lithium composite oxide and lithium-titanium composite oxide.

9. The secondary battery according to claim 1, wherein M is Ti.

10. The secondary battery according to claim 1, wherein M is Li.

11. The secondary battery according to claim 1, wherein M is Al.

12. The secondary battery according to claim 1, wherein M is Ni.

13. The secondary battery according to claim 1, wherein M is Cr.

14. The secondary battery according to claim 1, wherein M is Mg.

* * * * *